April 17, 1956  R. M. BARTH  2,742,239
METHOD FOR UNWINDING FILM STRIP
Filed Jan. 6, 1954
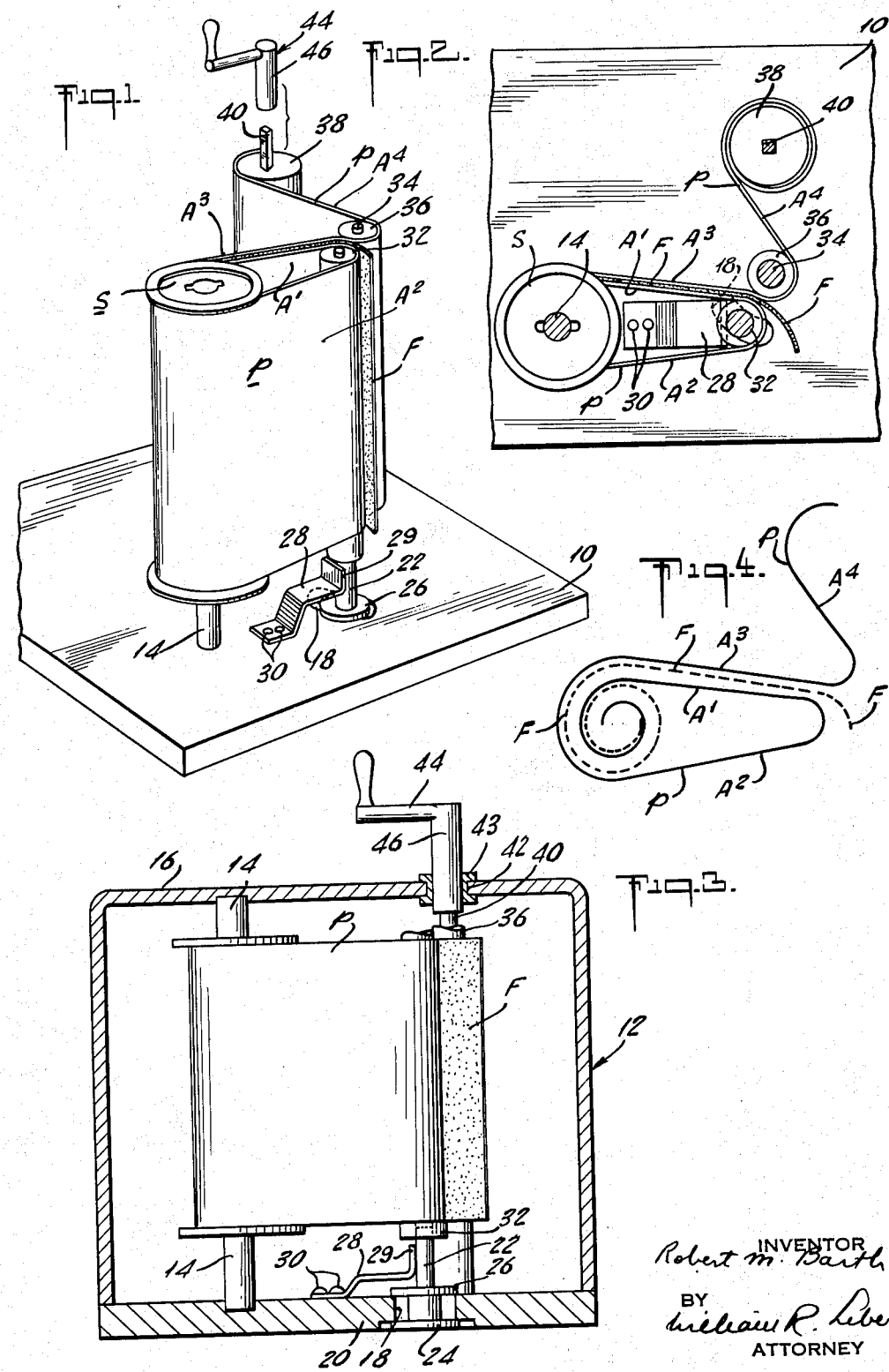
INVENTOR
Robert M. Barth
BY
William R. Lieberman
ATTORNEY

United States Patent Office 2,742,239
Patented Apr. 17, 1956

2,742,239

METHOD FOR UNWINDING FILM STRIP

Robert M. Barth, Pelham Manor, N. Y., assignor to The FR Corporation, New York, N. Y., a corporation of New York Application January 6, 1954, Serial No. 402,472

8 Claims. (Cl. 242—55)

The present apparatus relates to an improved method and apparatus for separating juxtaposed webs and it relates more particularly to an improved method and apparatus for use with backed roll film for separating the film from the protective backing to permit the processing of the film.

The roll of film employed in the conventional strip film still camera other than the 35 mm. and miniature cameras generally includes superimposed strips of photographic film and a protective paper backing wound upon an end flanged spool. The lead and trailing edges of the protective backing material extend far beyond the corresponding leading and trailing edges of the film so as to provide a light seal cover for the exposed and unexposed film and so as to permit the loading of the camera without unnecessarily exposing and wasting film. The emulsion side of the film faces away from the protective backing upon unrolling of the film and the leading edge of the unexposed film is secured by an adhesive strip to the protective backing. In the exposed roll of film the leading edge of the film secured to the protective backing is located inside the roll whereas the trailing unsecured edge is located at the outer part of the roll and the spool of film is received in this condition for developing or other processing steps. It is thus necessary to separate the strip of film from the protective backing prior to processing and this must be done in the absence of light. While this may be accomplished manually without the aid of mechanical devices this practice often leads to contamination of the photographic emulsion and other irreparable damage to the film. There have been many mechanical devices proposed for separating the film from the paper backing but these have not proven satisfactory, principally since they either do not operate properly or are entirely unreliable.

It is thus a principal object of the present invention to provide an improved method and apparatus for effecting the separation of superimposed strips of spooled webs.

Another object of the present invention is to provide an improved method and apparatus for effecting the separation of the strip film from the protective backing in the conventional spool of roll film.

Still another object of the present invention is to provide an improved method and apparatus for removing the strip film from the spool of roll film provided with the usual strip of protective backing, and delivering the film and protective backing to separate points.

A further object of the present invention is to provide a simple improved method and apparatus for removing strip film from the conventional spool of roll film and simultaneously separating the film from the protective backing without manual contact with the film surface.

Still a further object of the present invention is to provide an improved apparatus for the removal of strip film from a conventional spool of roll film and simultaneously separating and detaching the film and the usual protective backing, said apparatus being characterized by its ruggedness, simplicity, inexpensiveness and ease of operation.

The above and other objects of the present invention will become apparent from a reading of the following description taken in conjunction with the accompanying drawings wherein;

Figure 1 is a perspective view of a preferred embodiment of the present invention shown partially broken away and the housing removed;

Figure 2 is a top plan view thereof;

Figure 3 is an elevational view shown with the housing in position and partially in section; and Figure 4 is a schematic plan view of the film and backing illustrating their respective paths.

It has been found that a reliable, thorough and efficient separation of a strip film from a protective backing in the conventional spooled roll film can be effected by transporting it in the protective backing as it is unwound from the spool in a path looping about a cylindrical guide parallel to the axis of the spool and thence around the roll on the spool and thereafter toward said cylindrical guide. As the film is withdrawn from the spool it is sandwiched between the two layers of the protective backing extending from the spool to the guide, the outer layer being thereafter led along a divergent path to a take-up mechanism. The film is separated from the protective backing and discharged at the bite between the two sandwiching backing layers at the divergence of their paths.

An improved apparatus which may be employed in practicing the above method includes means for supporting a spool of film and protective backing for rotation about a predetermined axis, a first cylindrical guide laterally spaced from and parallel to said axis and a second cylindrical guide parallel to said first guide and closely radially spaced therefrom to permit the passage of said protective backing sandwiched film between said guides while retaining said film and said protective backing in said sandwiched condition at least to said first guide, and protective backing take-up means.

In accordance with a preferred embodiment of the present invention the spool supporting means consists of a vertical spindle mounted on a horizontal base and the first guide includes a laterally spaced vertical axle movable between closely spaced positions extending in the direction of the spindle, spring means being provided to urge the axle away from the spindle. A suitable idler roll is co-axially supported by the axle. A second guide member likewise consists of an axle-supported idler roll mounted adjacent to the first roll so that the confronting surfaces of the idler rolls define a bite relative to a spool supported by the spindle. The take-up mechanism is disposed laterally relative to the plane joining the axes of the spindle and the first idler roll and consists of a rotatable spool releasably engaged by a hand crank.

Reference is now made to the drawing which illustrates a preferred embodiment of the present invention, wherein the numeral 10 generally designates a support member formed of wood, plastic, metal or other suitable material and having a removable shell 12 which, together with the support 10 defines a housing for the improved mechanism. A vertically extending cylindrical spindle 14 is set in support 10, its upper end releasably engaging a corresponding recess formed in the inner face of the wall 16 of shell 12. Formed in support 10 is an arcuate slot 18 extending in the direction of the spindle 14 and provided with an inwardly directed shoulder 20 along its upper edge. A vertically arranged axle 22 is provided at its bottom with a disc shaped base 24 and a vertically spaced peripheral flange 26 to define between their confronting face an annular groove which engages the shoulder 20 and permits the axle 22 to slide laterally in the direction of the spindle 14 while maintaining a vertical position. A suitably stepped leaf spring 28 has one end secured to support 10 adjacent the inner end of the slot 18 by means of fasteners 30 and has its free end 29 bearing against the lower portion of the axle 22 resiliently to urge the axle 22 away from the spindle 14. A vertically disposed freely rotatable idler roll 32 formed of rubber, plastic or other suitable material is mounted on the axle 22 directly above the free end of the leaf spring 28. A second vertical axle 34 is mounted on support 10 immediately rearwardly and outwardly of the first axle 22 relative to the spindle 14 at the center of curvature of the slot 18, and supports a second freely rotatable idler roll 36 whose surface closely confronts the surface of the idler roll 32. The close spacing between the rolls 32 and 36 is substantially constant irrespective of the movement of the axle 22 in the groove 18 by virtue of the curvature of the groove 18. As an alternative the relative positions of the rollers 32 and 36 may be maintained constant and the spindle 14 may be spring urged away from the roller 32.

The protective backing take-up mechanism includes a vertical cylindrical spool 38 mounted on support 10 and is rotatable about an axis disposed rearwardly of the idler roll 36. Projecting upwardly from the spool 38 and coaxial therewith is a shaft 40 of square cross section. An opening 42 is formed in the shell top wall 16 directly above the shaft 40 and has registering therewith a bushing 43. A suitable handcrank 44 having a cylindrical shank 46 provided with a bore of square cross section corresponding to the shaft 40 passes through the bushing 42 and releasably engages the shaft 40 to facilitate the rotation of the take-up spool 38. The take-up spool 38 is provided with the conventional strip engaging element, not shown.

Considering now the operation of the apparatus described in practicing the improved method, the shell 12 is removed to permit the loading of the apparatus. A conventional spool S of exposed roll film is rotatably placed on the spindle 14, the film being wound on the spool S in a clockwise direction. The protective paper backing P is withdrawn from the spool S, manually carried along flight or path $A^1$ looped about the idler roll 32, returned along the flight or path $A^2$, looped around film roll on the spool S, carried along flight or path $A^3$ substantially parallel to the path $A^1$ through the bite defined by the idler rolls 32 and 36, about idler roll 36 along flight or path $A^4$ diverging from the path $A^2$ and thence into engagement with the take-up roll 38. There is normally a sufficient length of protective backing P beyond the end of the film F to permit the aforesaid loading operation without exposing the film F. Thereafter the shell 12 is replaced to effect a light tight closure, and the handcrank is brought into engagement with the spool shaft 40 and the take-up spool 38 is rotated.

As the backing P is withdrawn from the spool S the film F emerges from the spool S between the spool and the confronting face of the backing P as the latter leaves the spool S to follow the path $A^1$. The film F, however, due to its tendency to curl will leave the path of the backing P and travel along the spool into the bite defined by the spool P and the backing P at the leading end of the path $A^2$. The film F is then carried around the spool between the backing P as it emerges from the spool and on its end run between path $A^2$ and $A^3$. Thereafter the film F is transported sandwiched between the backing P along paths $A^1$ and $A^3$ into the bite between the idler rolls 32 and 36. At this point the backing P changes sharply in direction from its path $A^1$ and $A^3$ to paths $A^2$ and $A^4$ respectively. However, the film F normally has the tendency to take a slightly curved path and thus advances substantially forwardly along a loose curl detached from the backing P as the backing P is transported along its respective divergent paths. The film F may here have its end automatically engaged by any desired processing or take-up mechanism whereby the simple separation of the film F and backing P is effected. It should be noted that the linear speed and direction of travel of the film F as it is sandwiched between the backing P along the paths $A^1$ and $A^3$ is substantially the same as that of the backing P along these flights.

When the attached end of the film F is reached it emerges from the spool S between the spool S and the confronting face of the backing P as the latter starts along path $A^1$ and is adhesively secured to the aforesaid face of the backing P. Since at the point of emergence the film is carried along a path back around the spool as earlier described and the backing P travels in a diverging path along path $A^1$ toward the roller 32 a tearing or pulling action is effected between the attached portions of the film F and paper backing P to simply and readily separate the two and permit them to travel along their respective paths.

While there has been described and illustrated a preferred embodiment of the present invention it is apparent that numerous alterations and omissions may be made without departing from the spirit thereof. Having now described my invention, what I claim and desire to secure by Letters Patent is:

1. The method of removing strip film from a roll of said film wherein said film is provided with a protective backing extending along and beyond the ends of said film, including the steps of transporting said protective backing along a course including a pair of paths directed toward a discharge end and defining a confining zone between their confronting faces and advancing said film along said confining zone toward said discharge end.

2. The method in accordance with claim 1, wherein said paths mutually diverge in the vicinity of said discharge end.

3. The method in accordance with claim 1, wherein said protective backing is pulled along said paths and wound on a take-up spool.

4. The method in accordance with claim 1, wherein said paths are closely spaced and substantially parallel to each other.

5. The method in accordance with claim 1, wherein said film is transported at substantially the same linear speed as said protective backing.

6. The method of removing strip film from a spool of said film wherein said film is wound upon said spool with a superimposed strip of protective backing extending beyond the ends of said film, which method includes the steps of transporting said backing along a first path away from said spool, a second path returning toward said spool and connected to said first path by a curved end run, a third path extending parallel and outside side first path and joining said second path by a curved end run about said spool and advancing said film between said first and third paths beyond the terminus of said first path.

7. The method in accordance with claim 5, wherein said curved end run between said first and second paths is of lesser radius than the radius of said spool of film.

8. The method in accordance with claim 6, wherein said film emerges from said spool between said spool and said first path is returned to said spool between said spool and said second path travels about said spool and emerges between said third and said first paths.

References Cited in the file of this patent

UNITED STATES PATENTS

| | | |
|---|---|---|
| 1,131,849 | Magnus | Mar. 16, 1915 |
| 1,753,174 | Russell | Apr. 1, 1930 |
| 1,825,783 | Dunning et al. | Oct. 6, 1931 |
| 2,328,055 | Clough | Aug. 31, 1943 |
| 2,595,332 | Chipman et al. | May 6, 1952 |